United States Patent [19]
MacCragh et al.

[11] 3,713,816
[45] Jan. 30, 1973

[54] PROCESS FOR PREPARING TUNGSTEN-SILICA CERMETS

[75] Inventors: Adolfo P. MacCragh, Ellicott City; Arvind S. Patil, Silver Spring; George E. Ashby, Highland, all of Md.

[73] Assignee: W. R. Grace Co., New York, N.Y.

[22] Filed: April 2, 1970

[21] Appl. No.: 25,293

[52] U.S. Cl. ................................ 75/206, 75/211
[51] Int. Cl. .......................................... B22f 1/00
[58] Field of Search .............. 75/206, 211; 29/182.5

[56] References Cited

UNITED STATES PATENTS

| | | |
|---|---|---|
| 3,159,908 | 12/1964 | Anders, Jr. .......................... 75/206 |
| 3,087,234 | 4/1963 | Alexander et al. .................. 75/206 |
| 3,577,487 | 5/1971 | Sanchez ............................... 264/66 |
| 3,544,359 | 12/1970 | Oxley .................................. 75/206 |
| 3,475,159 | 10/1969 | Hansen ............................... 75/206 |

*Primary Examiner*—Carl D. Quarforth
*Assistant Examiner*—B. Hunt
*Attorney*—Joseph P. Nigon and Kenneth E. Prince

[57] ABSTRACT

A process for preparing cermets of tungsten and silica by mixing a source of tungsten such as ammonium metatungstate or tungsten sol with a silica sol, passing the resulting mixture through a fluid energy mill and reducing the tungsten in the effluent of the mill with hydrogen. The product is then sintered in an inert atmosphere at a temperature in excess of 1,500° C.

3 Claims, No Drawings

PROCESS FOR PREPARING TUNGSTEN-SILICA CERMETS

Cermets of tungsten and silica are refractory materials characterized by resistance to abrasion at high temperatures. Several uses of these materials are well known. Their corrosion and wear resistant properties make them particularly suitable in applications such as sand blasting nozzles and other applications where resistance to wear is important.

The tungsten-silica cermets are generally prepared by mixing tungsten powders with silica followed by ball milling, sintering, and reducing steps. These materials are not satisfactory because of the difficulties in fabricating into the desired shape.

It has been recognized that fabrication problems could probably be eliminated if the tungsten and silica particles making up the cermet where in the lower micron size range. This is particularly important in the case of tungsten since the cermets produced have much better properties when the tungsten particles are less than 5 microns in diameter.

We have found that a cermet of tungsten and silica can be prepared in which the tungsten particles range in size from 1 micron to less than 5 microns by a process in which a source of tungsten that is easily converted to the oxide is admixed with a low sodium silica sol. The resulting mixture is passed through a fluid energy mill where the tungsten salt is converted to the oxide and an intimate admixture of the tungstic oxide and silica result. The mill effluent is subjected to reduction. The resulting tungsten and silica particles are in the colloidal size range and thus are very intimately dispersed.

The first step in our process is the selection of the proper reactants. The most advantageous method of incorporating tungsten is to add it as a solution of a salt of tungsten that is readily converted to the oxide. Ammonium metatungstate is readily converted to the oxide under relatively mild conditions. Another possible source of tungsten is a tungsten sol. This can be prepared from ammonium tungstate by the precipitation and peptization technique. However, since such a process involves additional steps, ammonium metatungstate is the preferred salt for use in preparing the solutions used to supply the tungsten in our novel process.

The silica sol used can be any commercially available sol. Since the deleterious effect of sodium is well known, the sol must have a low sodium content. The silica sol known as "Ludox" that is sold commercially by du Pont Company gives satisfactory results. Other silica sols that have a low sodium content give satisfactory results. It is important that these materials have a sodium content of less than 300 parts per million. Suitable silica sols for use in our novel process can also be prepared from sodium silicate solution provided it is electrodialyzed or ion exchanged to remove the sodium. A suitable silica sol can also be prepared by hydrolysis of ethylorthosilicate.

The silica sol and the source of tungsten, either the tungsten oxide sol or ammonium metatungstate are mixed in the desired proportion. The tungsten component of these cermets composes from about 1 to 99 percent of the final product; the balance being silica. In a typical cermet, the final product contained 66.1 weight percent rungsten, 33.0 weight percent silica, and had a sodium content of less than 300 parts per million.

The next step of the process is processing these materials in a fluid energy mill at elevated temperatures. The fluid energy mill is a standard article of commerce and the normal use of these mills to reduce particle size is well known. Fluid energy milling effects comminution by interparticle abrasion.

In our novel process, we prefer to operate the mill at about 300°–400° C. In addition to size reduction, the mill, when operated at these temperatures, prevents the growth of particles and the agglomeration that normally results when particles are dried using conventional techniques.

Dehydration in the fluid energy mill is extremely rapid and takes place at higher temperatures for shorter periods of time. The effluent of the mill is a fine high surface area powder that can be easily formed into any desired shape.

Since the product recovered from the mill is a colloidal mixture of tungsten oxide and silica, the tungsten must be reduced to the metal. This is accomplished by reduction in hydrogen at a temperature of about 1,000° C. The upper limit of the reduction step is not critical but carrying out the reduction at temperatures of more than 1,100° C. does not result in any advantage that would offset the additional cost of increasing the temperature. The reduction is normally carried out for a period of about 1 to 4 hours and is essentially complete in about 2 hours.

The milled product is sintered in an inert atmosphere to prevent reoxidation of the tungsten. The sintering is normally carried out at a temperature of 1,500°–1,800° C. with a temperature of 1,550°–1,650° C. being preferred. Since silica melts at 1,650° C., it is desirable to keep the temperature in the sintering furnace below 1,650° C.

After the products have been sintered, they may be formed in any desired shape. The cermets are frequently used to prepare nozzles for sand blasting equipment or in other areas that require good abrasion resistance at elevated temperatures.

Our invention is further illustrated by the follow specific but non-limiting examples.

EXAMPLE 1

A total of 690 grams of ammonium metatungstate $((NH_4)_2 \cdot _4O_{13} \cdot 8H_2O)$ was dissolved in 700 ml. of ammonium to prepare a solution having a pH of 9.0. A total of 700 grams of a 30 percent silica sol was added and the mixture was stirred vigorously for one-half hour. The mixture was then dried and milled in a fluid energy mill, operated at a temperature of about 700° C., for a period of about 30 minutes. The resulting powder was a mixture of $WO_3$ and $SiO_2$. The tungsten oxide was reduced to metallic tungsten by heating the powder in a stream of hydrogen at a temperature of 1,000° C. The reduced powder was pressed to a density of 3.39 grams/cc. and had a chemical analysis of 66.1 weight percent tungsten, 33.9 weight percent silica, and less than 750 ppm of sodium. The other impurities in the product accounted for less than 0.1 weight percent. On x-ray diffraction pattern of the product it was found that the tungsten was reduced to the metallic form. No diffraction lines for crystalline silica could be observed.

EXAMPLE 2

This example illustrates the preparation of a cermet in which the principal component was silica and the tungsten was present in the final product as only 2.3 weight percent.

A total of 199 grams of ammonium metatungstate were dissolved in 700 ml of ammonia solution. The silica sol, 2,020 grams of a 30 percent sol, was added and the mixture was stirred vigorously for a period of one-half hour. The product was then dried and milled in a fluid energy mill at a temperature of about 700° C. for about 30 minutes. The resulting $WO_3/SiO_2$ powder was reduced in a stream of hydrogen at a temperature of about 1,000° C. The reduced powder was pressed and sintered in an argon atmosphere at 1,750° C. The final analysis of the product was 2.3 weight percent tungsten, 97.7 weight percent silica. The product contained 300 ppm of sodium.

Obviously, many modifications and variations of the invention may be made without departing from the essence and scope thereof and only such limitations should be applied as are indicated in the appended claims.

What is claimed is:

1. A process for preparing cermets of tungsten and silica composed of particles having a particle size of less than 10 microns which comprises the steps of:
   a. admixing a source of tungsten selected from the group consisting of solutions of ammonium metatungstate and tungsten oxide sol with a silica sol.
   b. passing the resulting mixture through a fluid energy mill operated at an outlet temperature of 300°–400° C.
   c. converting the tungsten oxide in the mill effluent to the metal by heating to at least about 1,00° C in an atmosphere of hydrogen,
   d. sintering the resulting product in an atmosphere of an inert gas at a temperature of 1,500°–1,800° C for 2–8 hours,
   e. recovering the tungsten-silica cermet as a product.

2. The process according to claim 1 wherein the cermet contains from 1 to 99 weight percent silica, the balance being tungsten.

3. A process for preparing tungsten-silica cermets composed of particles having a particle size of less than 10 microns which comprises the steps of:
   a. admixing a solution of ammonium metatungstate with a silica sol in amounts such that the tungsten content of the product will be between 10 to 80 weight percent,
   b. passing the resulting mixture through a fluid energy mill operated to have an outlet temperature of about 300°–400° C.,
   c. converting the tungsten oxide in the mill effluent to the metal by heating to about 900° C. in a hydrogen atmosphere for 2 to 6 hours,
   d. sintering the resulting product in an argon atmosphere at a temperature of about 1,500°–1,650° C. for about 2 to 8 hours, and
   e. recovering the product tungsten-silica cermet.

* * * * *